Patented Nov. 13, 1923.

1,474,216

UNITED STATES PATENT OFFICE.

JOSEPH VAN RUYMBEKE, OF MARSEILLE, FRANCE.

PRODUCTION OF ALCOHOL.

No Drawing.   Application filed April 14, 1922. Serial No. 552,629.

*To all whom it may concern:*

Be it known that I, JOSEPH VAN RUYMBEKE, a subject of the King of Belgium, residing at Les Tamaris, Vieille-Chapelle, Marseille, in the Republic of France, have invented certain new and useful Improvements in the Production of Alcohol, of which the following is a specification.

This invention relates to a process for the production of alcohol of high strength, and consists in an improvement in or modification of the invention described and claimed in the specification of my United States patent application Serial No. 492,466, filed 15th August, 1921, now Patent 1,459,699. In the process described and claimed in the afore-mentioned specification, alcohol is distilled in a rectifying column through which a counter-current of glycerine flows, whereby alcohol of considerably increased concentration, up to about 98 to 99 per cent could be obtained.

The object of the present invention is to obtain, by means of distillation or rectification, alcohol of a still higher concentration then that obtainable by the use of pure glycerine, say of 99.8 per cent or even higher.

According to the present invention a process for the production of alcohol of very high strength consists in bringing alcohol vapours into contact with a solution comprising glycerine and an anhydrous salt of a hygroscopic nature in a rectifying column, the said solution acting as a dehydrating agent whereby alcohol of strength 99.8 per cent or higher may be obtained. For this purpose the alcohol is distilled in a rectifying column through which flows a counter-current of a solution comprising glycerine and an anhydrous salt of a hygroscopic nature such as calcium choride, zinc chloride, or potassium carbonate etc., and by suitably regulating the rates of flow of the alcohol vapour and the aforementioned solution, the alcohol leaving the column, when condensed and cooled in the usual manner, can be obtained of a strength of 99.8 per cent or higher, the methods of operation of the process being otherwise similar to those described in my prior specification above referred to, and being applicable to apparatus in which the rectification is applied to 92 or 93 per cent alcohol in a separate plant, or to apparatus of a continuous or discontinuous type in which the necessary modifications are embodied for effecting the rectification in the presence of the glycerine solution of the anhydrous salt or salts. Glycerine solutions of the nature mentioned above are more efficient dehydrating agents than pure glycerine, and the glycerine solution which flows to the bottom of the rectifying column and which carries with it water and alcohol may be regenerated after use and again employed in the cycle of operations of the process, just as easily as in the case when pure glycerine is employed. For this purpose the aqueous solution consisting of water, glycerine, the salt employed, and alcohol is withdrawn from the bottom of the rectifying column, the alcohol distilled off therefrom by means of steam, and thereafter the remaining diluted solution of glycerine, water, and the salt is concentrated to the required degree of concentration, for example, by heating it in vacuo to 160° C., or alternatively the glycerine may be recovered therefrom when desired by distillation in vacuo.

What I claim and desire to secure by Letters Patent of the United States is:—

1. A process for the production of alcohol of very high strength consisting in bringing alcohol vapours into contact with a solution comprising glycerine and an anhydrous salt of a hygroscopic nature in a rectifying column, the said solution acting as a dehydrating agent.

2. A process for the production of alcohol of very high strength consisting in distilling the alcohol in a rectifying column and passing down said rectifying column at a predetermined rate a counter-current of a solution comprising glycerine and an anhydrous salt of a hygroscopic nature.

3. A process for the production of alcohol of very high strength consisting in bringing alcohol vapours into contact with a solution comprising glycerine and an anhydrous salt of a hygroscopic nature in a rectifying column, withdrawing the aqueous solution consisting of water, glycerine, the said salt, and alcohol which flows to the bottom of the rectifying column, and subjecting the said aqueous solution to distillation to recover the alcohol therefrom.

4. A process for the production of alcohol of very high strength consisting in bringing alcohol vapours into contact with a solution comprising glycerine and anhydrous calcium chloride in a rectifying column, the said solution acting as a dehydrating agent.

5. A process for the production of alcohol of very high strength consisting in distilling the alcohol in a rectifying column and passing down said rectifying column at a predetermined rate a counter-current of a solution comprising glycerine and anhydrous calcium chloride.

6. A process for the production of alcohol of very high strength consisting in bringing alcohol vapours into contact with a solution comprising glycerine and anhydrous calcium chloride in a rectifying column, withdrawing the aqueous solution consisting of water, glycerine, calcium chloride, and alcohol which flows to the bottom of the rectifying column, and subjecting the said aqueous solution to distillation to recover the alcohol therefrom.

7. A process for the production of alcohol of strength 99.8 per cent or higher consisting in bringing alcohol vapours into contact with a solution comprising glycerine and an anhydrous salt of a hygroscopic nature in a rectifying column, the said solution acting as a dehydrating agent.

JOSEPH VAN RUYMBEKE.